(No Model.)
F. E. MERRIMAN.
POULTRY DRINKING FOUNTAIN.
No. 405,369. Patented June 18, 1889.
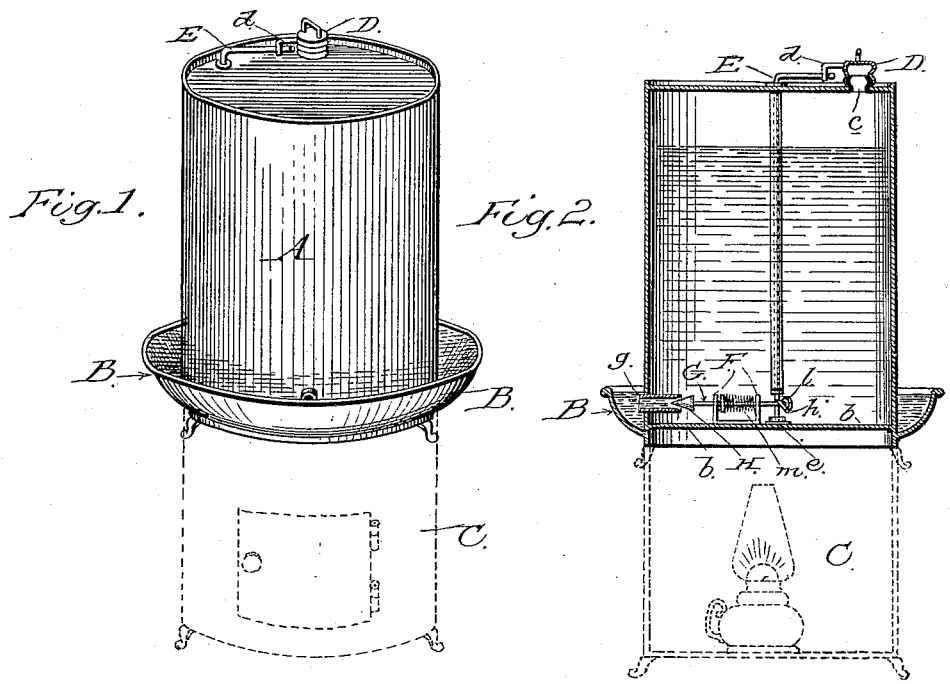
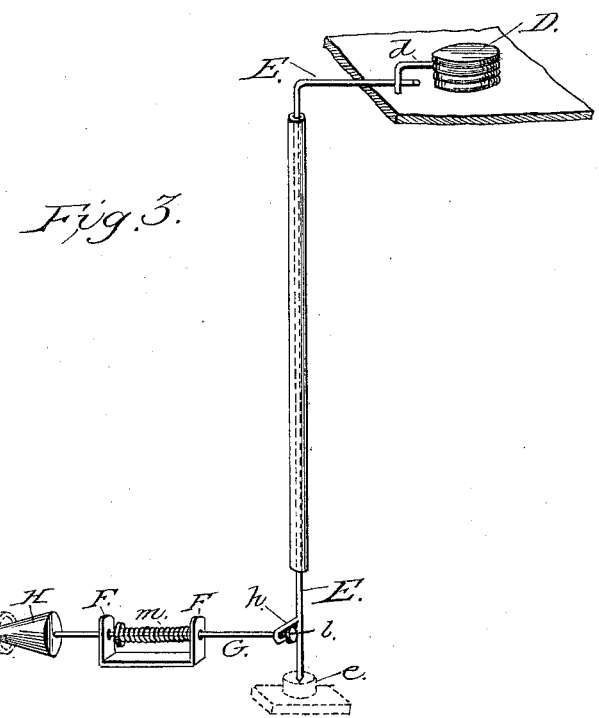
WITNESSES,
INVENTOR,
Francis E. Merriman

UNITED STATES PATENT OFFICE.

FRANCIS E. MERRIMAN, OF BOSTON, MASSACHUSETTS.

POULTRY DRINKING-FOUNTAIN.

SPECIFICATION forming part of Letters Patent No. 405,369, dated June 18, 1889.

Application filed April 3, 1889. Serial No. 305,841. (No model.)

*To all whom it may concern:*

Be it known that I, FRANCIS E. MERRIMAN, a citizen of the United States, residing at Boston, in the county of Suffolk and State of Massachusetts, have invented certain new and useful Improvements in Poultry Drinking-Fountains; and I do hereby declare the following to be a full, clear, and exact description of the invention, such as will enable others skilled in the art to which it appertains to make and use the same, Referring to the drawings, Figure 1 represents a perspective view of my improved drinking-fountain. Fig. 2 is a vertical sectional view of the same. Fig. 3 is a detail in perspective of the valve and its actuating mechanism.

My invention relates to poultry culture, and especially to the drinking-fountains by which the fowls are furnished with a bountiful supply of fresh clean water; and my invention consists in the constructions and combinations of devices, which I shall hereinafter fully describe and claim.

Referring to the drawings, A indicates a vessel of any suitable shape, preferably cylindrical, and of any desired size, and B is a trough entirely surrounding said vessel at a point near its bottom portion and receiving the water discharged from the vessel in a manner I will hereinafter fully indicate.

The vessel A is provided with a partition or bottom $b$, and when the device is used in excessively-cold weather it may be provided with an underlying heating-chamber C, which may contain a lamp or other heating medium, by means of which the water in the vessel A may be warmed or kept at a temperature sufficiently high to prevent it freezing.

The vessel A at its top is provided with a filling-opening $c$, which is protected and closed by a screw-cap D, and said cap is formed or provided with a bent arm or projection $d$, which is designed to engage the bent upper end of a rod E, passing vertically through the vessel A, and having its lower end mounted in a step $e$, secured to the bottom or partition $b$, as shown in Fig. 2. Suitable standards F, secured to said bottom or partition $b$, extend upwardly therefrom and are pierced to receive a horizontally-moving valve-stem G, which carries at one end, just inside the casing of the vessel, a conical valve H, which is designed to find a seat against the inner end of a short tube $g$, let through the side of the vessel A at a point just below the water-line of the encircling trough, whereby, when the valve is withdrawn by the means I will hereinafter fully describe, the water from the interior of the vessel A will pass through the tube or outlet $g$ and enter the trough, where it is accessible to the fowls or stock.

The rod E, which passes vertically through the vessel A, is formed or provided with a laterally-extending arm $h$ at its lower end, and the inner end of the valve-stem G has a collar $l$, which is engaged by the movement of the arm $h$ when the rod E is moved to withdraw the conical valve from its seat in the outlet tube $g$ to permit the escape of water to the trough, a spring $m$, encircling the valve-stem between the standards F, serving to project the conical valve forward into the tube $g$ when the valve-stem is released from its engagement with the arm $h$ of the vertical rod E.

From the foregoing description it will be seen that in filling the vessel the cap D is removed and the water let in through the opening at the top, the valve H being held tightly against its seat in the tube $g$ and preventing the escape of the water while the vessel A is filling. When the vessel is as full as desired, the cap D is screwed in place to close the opening and exclude the air, and as said cap is turned to secure it its bent arm or projection $d$ strikes the bent upper end of the vertical rod E and causes said rod to turn on its axis, whereby its lower lateral arm $h$ is brought into engagement with the collar or pin $l$ and forces the valve-stem and valve inward against the tension of the spring. The valve being withdrawn, the water is now permitted to flow through the tube or outlet $g$ into the surrounding trough, in which it rises until the discharge end of the tube is submerged, when the flow of water ceases until enough of the water in the trough is consumed to again expose the discharge end of the tube $g$, when the water again commences to run into the trough.

In operating the valve-stem the valve need not be withdrawn entirely from the tube, but need only be moved away from its seat therein a short distance, and when the rod E is released from its engagement with the valve-stem the spring throws the valve forward and effectually closes the discharge-tube.

To cause the conical valve to be firmly seated, I prefer to make the holes in the standards through which the valve-stem moves somewhat enlarged, so that any displacement from the tube $g$ may be provided for and the valve insured of a close seat in the tube, whereby leakage is avoided.

By making the trough extend all around the vessel, I am permitted to place the vessels between the adjoining pens, so as to supply the fowls in each pen, and by enlarging the dimensions of the device the same may be used for stock purposes and other animals.

Having thus described my invention, what I claim as new, and desire to secure by Letters Patent, is—

1. The combination, with the vessel having the inlet and outlet openings, of a cap closing the inlet-opening and provided with a projection or arm, a horizontally-moving valve closing the outlet, and a rod between the valve-stem and screw-cap provided with means for withdrawing the valve when the cap is fitted in position.

2. The combination, with the vessel having the inlet at its top, a discharge-tube, and a trough into which the tube discharges, of a vertical rod movable on its axis and provided with an upper and lower laterally-projecting arm, a screw-cap fitted over the inlet at the top of the can, having an arm or projection which engages and axially moves the vertical rod when the screw-cap is turned, a horizontally-moving valve-stem actuated by the lower arm of the rod, and a conical valve adapted to be seated in the discharge-tube and to be withdrawn therefrom when the screw-cap is turned, substantially as herein described.

3. The vessel A, having the surrounding trough, the inlet at its top, and the discharge-tube entering into the trough, in combination with the horizontally-moving valve-stem, the valve thereon adapted to be seated in the discharge-tube, a spring surrounding the valve-stem, a vertical rod movable on its axis and having upper and lower lateral arms, and a screw-cap fitted over the inlet to the vessel, having an arm extending outwardly and engaging the upper arm of the vertical rod, whereby said rod is moved on its axis and the valve withdrawn by the lower arm of said rod engaging the valve-stem, substantially as herein described.

4. The combination, with the vessel having an inlet and outlet and a trough into which the outlet discharges, of a horizontally-moving conical valve for closing said outlet, a screw-cap for closing the inlet and provided with a projection, an axially-moving rod engaged by the projection on the screw-cap to withdraw the valve when the cap is fitted in position, and a spring for returning the valve and closing the outlet when the screw-cap is removed for filling the vessel, substantially as herein described.

5. The vessel having the heating-chamber beneath, the trough surrounding the vessel, the tube discharging into the trough, and the inlet at the top of the vessel, in combination with a screw-cap having the arm or projection, the vertical rod having its upper bent end engaged thereby and having a laterally-projecting arm at its bottom, the standards, the horizontally-moving valve-stem mounted therein, having a conical valve adapted to automatically close the discharge when the screw-cap is removed, and a spring for forcing the valve to its seat, said valve-stem being actuated and the valve withdrawn when the screw-cap is fitted in position, substantially as herein described.

In testimony whereof I affix my signature in presence of two witnesses.

FRANCIS E. MERRIMAN.

Witnesses:
S. M. MINASIAN,
FRED. J. LA PENOTIERE.